(12) United States Patent
Nagao et al.

(10) Patent No.: US 9,561,496 B2
(45) Date of Patent: Feb. 7, 2017

(54) EXHAUST GAS PURIFICATION CATALYST AND THE METHOD FOR PRODUCING THE SAME

(71) Applicant: TOYOTA JIDOSHA KABUSHIKI KAISHA, Toyota-shi, Aichi-ken (JP)

(72) Inventors: Satoshi Nagao, Gotenba (JP); Kazutoshi Akashi, Minamiashigara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/076,151

(22) Filed: Mar. 21, 2016

(65) Prior Publication Data
US 2016/0279614 A1  Sep. 29, 2016

(30) Foreign Application Priority Data
Mar. 27, 2015 (JP) .................. 2015-067666

(51) Int. Cl.
| | |
|---|---|
| B01D 53/56 | (2006.01) |
| B01D 53/94 | (2006.01) |
| B01J 8/02 | (2006.01) |
| B01J 21/00 | (2006.01) |
| B01J 21/02 | (2006.01) |
| B01J 23/00 | (2006.01) |
| B01J 23/02 | (2006.01) |
| B01J 23/10 | (2006.01) |
| B01J 23/40 | (2006.01) |
| B01J 23/42 | (2006.01) |
| B01J 23/648 | (2006.01) |
| F01N 3/08 | (2006.01) |
| F01N 3/10 | (2006.01) |
| B01J 37/02 | (2006.01) |

(52) U.S. Cl.
CPC ........ *B01J 23/6484* (2013.01); *B01D 53/9413* (2013.01); *B01J 37/0221* (2013.01); *F01N 3/0842* (2013.01); *F01N 3/108* (2013.01); *B01D 2255/1025* (2013.01); *B01D 2255/209* (2013.01); *B01D 2255/2092* (2013.01)

(58) Field of Classification Search
CPC ........... B01J 23/16; B01J 23/464; B01J 23/54; B01J 23/6484; B01D 53/945
USPC ....... 502/246, 261, 304, 326, 349–351, 353, 502/439; 423/213.2
See application file for complete search history.

(56) References Cited

U.S. PATENT DOCUMENTS

| | | | | |
|---|---|---|---|---|
| 3,833,410 A | * | 9/1974 | Ang ..................... | C23C 14/185 204/192.22 |
| 4,410,450 A | * | 10/1983 | Sasaki ..................... | B01J 23/90 502/208 |
| 4,957,561 A | * | 9/1990 | Esashi ................... | C04B 41/009 106/286.3 |
| 5,326,736 A | * | 7/1994 | Hashimoto ............ | B01J 21/063 423/213.5 |

(Continued)

FOREIGN PATENT DOCUMENTS

| | | |
|---|---|---|
| JP | 2009-183895 A | 8/2009 |
| JP | 2012-096234 A | 5/2012 |

*Primary Examiner* — Cam N. Nguyen
(74) *Attorney, Agent, or Firm* — Oliff PLC

(57) ABSTRACT

An object of the present invention is to provide an exhaust gas purification catalyst having an improved NOx purification performance in a lean atmosphere; and a method for producing the same. The method for producing an exhaust gas purification catalyst according to the present invention includes sputtering a target material containing Nb and Rh to produce fine composite-metal particles containing Nb and Rh.

11 Claims, 5 Drawing Sheets

(56) References Cited

U.S. PATENT DOCUMENTS

| | | | | |
|---|---|---|---|---|
| 5,670,443 | A * | 9/1997 | Irite | B01D 53/9418 |
| | | | | 423/213.2 |
| 6,365,545 | B1 * | 4/2002 | Komatsu | B01J 35/004 |
| | | | | 502/326 |
| 7,435,274 | B2 * | 10/2008 | Suenaga | B01J 15/005 |
| | | | | 422/222 |
| 8,430,978 | B2 * | 4/2013 | Inoue | C22C 5/00 |
| | | | | 148/403 |
| 9,278,338 | B2 * | 3/2016 | Coupland | B01D 53/9436 |
| 2001/0022290 | A1 * | 9/2001 | Shiota | B01J 21/18 |
| | | | | 210/749 |
| 2003/0129099 | A1 * | 7/2003 | Zhang | B01D 53/945 |
| | | | | 422/177 |
| 2004/0142230 | A1 * | 7/2004 | Katori | B01J 23/40 |
| | | | | 429/482 |
| 2007/0184971 | A1 * | 8/2007 | Fokema | F02K 9/68 |
| | | | | 502/177 |
| 2008/0064914 | A1 * | 3/2008 | Fokema | B01J 23/002 |
| | | | | 588/403 |
| 2009/0010792 | A1 * | 1/2009 | Yi | H01L 21/76873 |
| | | | | 419/68 |
| 2009/0130010 | A1 * | 5/2009 | Jantsch | B01D 53/8628 |
| | | | | 423/239.1 |
| 2009/0186230 | A1 * | 7/2009 | Sun | C22C 1/002 |
| | | | | 428/457 |
| 2009/0286680 | A1 * | 11/2009 | Hirano | B01J 37/0221 |
| | | | | 502/326 |
| 2013/0189172 | A1 * | 7/2013 | Spurk | B01D 53/9418 |
| | | | | 423/213.2 |
| 2015/0182912 | A1 * | 7/2015 | Fisher | B01D 53/9413 |
| | | | | 423/213.2 |

* cited by examiner

EXHAUST GAS PURIFICATION CATALYST AND THE METHOD FOR PRODUCING THE SAME

TECHNICAL FIELD

The present invention relates to an exhaust gas purification catalyst and a method for producing the same. More specifically, the present invention relates to an exhaust gas purification catalyst with an improved NOx purification performance in a lean atmosphere, and a method for producing the same.

BACKGROUND ART

Exhaust gas emitted from internal combustion engines, such as gasoline engines or diesel engines, for automobiles and the like, contain harmful components, such as carbon monoxide (CO), hydrocarbons (HC), nitrogen oxides (NOx), and the like.

Therefore, an internal combustion engine is typically provided with an exhaust gas purification device for decomposing and removing these harmful components, and most of the harmful components are rendered innocuous by an exhaust gas purification catalyst mounted in the exhaust gas purification device.

Known examples of the exhaust gas purification catalyst as described above include a NOx storage-reduction catalyst. The NOx storage-reduction catalyst is a catalyst which stores NOx contained in an exhaust gas in a lean atmosphere, and reduces the NOx to nitrogen ($N_2$) in a stoichiometric atmosphere and a rich atmosphere, effectively utilizing the changes in the exhaust gas components in the lean, stoichiometric, and rich atmospheres.

However, a problem with respect to the purification of NOx in a lean atmosphere still remains, and various techniques have been examined and proposed.

Patent Document 1 discloses a metal-containing colloidal particle-supporting support in which metal-containing colloidal particles containing Nb and Rh are supported on a support material.

Patent Document 2 discloses an exhaust gas purification catalyst in which Rh is supported on a support, and the support is composed of an Nb oxide having an Allred-Rochow electronegativity in the range of 1.23 or more and less than 1.40.

PRIOR ART DOCUMENTS

Patent Documents

Patent Document 1: Japanese Unexamined Patent Publication 2012-096234
Patent Document 2: Japanese Unexamined Patent Publication 2009-183895

SUMMARY OF THE INVENTION

Problems to be Solved by the Invention

In the metal-containing colloidal particle-supporting support disclosed in Patent Document 1, there is a possibility that a plurality of the metal-containing colloidal particles containing Nb and Rh may not have a uniform particle size and a composition ratio of elements.

An object of the present invention is to provide fine composite-metal particles which can be used for the purification of NOx in a lean atmosphere; and a method for producing the same.

Means for Solving the Problems

The present inventors have discovered that the above mentioned problems can be solved by adopting the following constitutions.
<1> A method for producing an exhaust gas purification catalyst, the method including sputtering a target material containing Nb and Rh to produce fine composite-metal particles containing Nb and Rh.
<2> The method according to item <1>, further including supporting the fine composite-metal particles on a powdered support.
<3> The method according to item <1> or <2>, wherein the target material is a micromixed target material obtained by mixing Nb powder and Rh powder, and then by molding and sintering the resultant.
<4> An exhaust gas purification catalyst including a plurality of fine composite-metal particles containing Nb and Rh.
<5> The exhaust gas purification catalyst according to item <4>, further including a powdered support, wherein the fine composite-metal particles are supported on the powdered support.
<6> The exhaust gas purification catalyst according to item <5>, wherein the powdered support is a powdered support selected from the group consisting of $SiO_2$, $ZrO_2$, $CeO_2$, $Al_2O_3$, $TiO_2$, solid solutions thereof, and combinations thereof.
<7> The exhaust gas purification catalyst according to any one of items <4> to <6>, wherein the average Nb content in the plurality of the fine composite-metal particles is 1 atomic % or more and 30 atomic % or less.
<8> The exhaust gas purification catalyst according to item <7>, wherein 70% or more of the fine composite-metal particles, based on the number of the particles, have a Nb content in the range of from 40% to 160% of the average Nb content in the plurality of the fine composite-metal particles.
<9> The exhaust gas purification catalyst according to any one of items <4> to <8>, wherein 70% or more of the fine composite-metal particles, based on the number of the particles, have a particle size in the range of from 60% to 140% of the average particle size of the plurality of the fine composite-metal particles.
<10> The exhaust gas purification catalyst according to any one of items 4 to 9, wherein the exhaust gas purification catalyst is a catalyst for purifying NOx.
<11> A method for purifying exhaust gas, wherein the exhaust gas purification catalyst according to item <10> is brought into contact with an exhaust gas containing NOx in a lean atmosphere, and thereby reducing NOx, to purify the exhaust gas.

Effect of the Invention

According to the present invention, it is possible to provide an exhaust gas purification catalyst having an improved NOx purification performance in a lean atmosphere; and a method for producing the same.

DETAILED DESCRIPTION OF THE INVENTION

Figure 1:
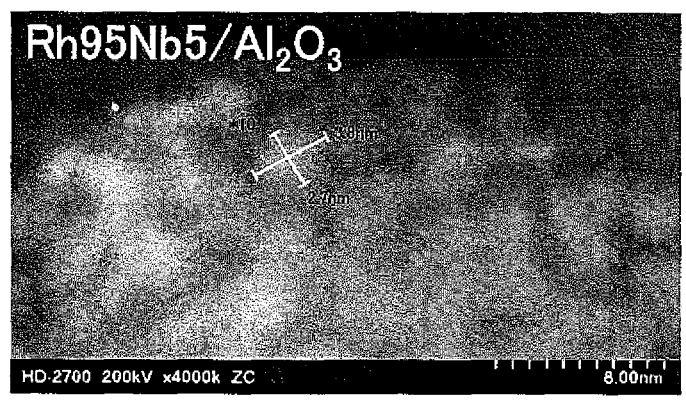
FIG. 1 is a STEM image of the exhaust gas purification catalyst in Example 1, obtained by analyzing the catalyst by a scanning transmission electron microscope with an energy dispersive X-ray analyzer (STEM-EDX).

The embodiments of the present invention will now be described in detail. However, the present invention is not limited by the following embodiments, and various modifications are possible within the scope of the present invention.

<<Method for Producing Exhaust Gas Purification Catalyst>>

The method for producing an exhaust gas purification catalyst according to the present invention includes sputtering a target material containing Nb and Rh to produce fine composite-metal particles containing Nb and Rh.

In general, nano-sized fine metal particles have an electronic energy structure that is different from the energy structure of a mass of metal due to the quantum size effect, and exhibit different electrical and optical properties depending on the particle size. Further, nano-sized fine metal particles having a very high specific surface area are believed to function as a highly active catalyst.

As a method for producing nano-sized fine metal particles as described above, a so-called co-impregnation method is well known in which, for example, a mixed solution containing salts of a plurality of different metal elements is used to support fine composite-metal particles on a powdered support.

However, in general, a conventional co-impregnation method as described above may not be able to produce fine composite-metal particles in which a specific combination of Nb and Rh are contained and in which these metal elements coexist at nano-level.

Without being bound by any theory, the reason for this is believed to be that: the precursor of Nb is easily and quickly hydrolyzed in an aqueous solution; it is difficult to stabilize the precursor of Nb even under strongly acidic conditions; and/or Nb and Rh are individually deposited as Nb fine particles and Rh fine particles, respectively.

Further, as one of the methods for producing fine composite-metal particles containing a plurality of metal elements, a chemical reduction method is known in which a reducing agent such as an alcohol is added to a mixed solution containing salts of respective metal elements constituting the fine composite-metal particles, and the ions of the respective metal elements contained in the resulting mixed solution are reduced simultaneously, while heating the mixed solution as required.

However, since the above mentioned method for producing fine composite-metal particles, in which a reducing agent is used, includes reducing salts or ions of respective metal elements dissolved in the solution, it is very difficult to produce fine composite-metal particles in which respective metal elements coexist at nano-level, when there is a difference in susceptibility to reduction, such as difference in oxidation-reduction potential, of salts or ions of the respective metal elements.

Specifically, when a reducing agent such as an alcohol is added to a mixed solution containing Nb ions and Rh ions, Rh ions which are more susceptible to reduction as compared to Nb ions, are believed to be reduced preferentially by the reducing agent, instead of Nb ions and Rh ions being reduced simultaneously, thereby resulting in a growth of Rh particles.

This is believed to result in not producing fine composite-metal particles in which Nb and Rh coexist at nano-level, but in producing the separate formation of Nb fine particles and Rh fine particles, or but in not producing Nb fine particles at all.

Even when a method other than the above, such as a co-precipitation method or citric acid method is used, in general, it may be difficult to produce fine composite-metal particles in which Nb and Rh coexist at nano-level, for the same reason as described for the above mentioned co-impregnation method.

Therefore, it may be virtually impossible to produce fine composite-metal particles in which Nb and Rh are formed in a composite, even when employing a conventional wet method, such as a co-impregnation method or chemical reduction method. Accordingly, it is believed that the production of an exhaust gas purification catalyst having an improved NOx purification performance in a lean atmosphere may not be possible.

In contrast, the fine composite-metal particles produced by the method according to the present invention are produced by using a so-called dry method, in which include sputtering a target material containing Nb and Rh. Therefore, by using the method according to the present invention, it is possible to produce fine composite-metal particles containing Nb and Rh, while avoiding the problems associated with the above mentioned wet methods.

The method according to the present invention may further and optionally include supporting the fine composite-metal particles on a powdered support, during or after sputtering.

Any method can be used for supporting the fine composite-metal particles on a powdered support. Examples of the method for supporting the fine composite-metal particles on a powdered support, can include a method in which the above mentioned sputtering process is performed over the powdered support to directly support the fine composite-metal particles on the powdered support.

<Target Material>

According to the method of the present invention, the target material contains Nb and Rh.

The target material containing Nb and Rh is not particularly limited, and any suitable material can be used. As examples of the target material, a target material in which Nb and Rh are arranged alternately, or a micromixed target material obtained by mixing Nb powder and Rh powder, and then by molding and sintering the resultant, and the like, can be used.

As the target material in which Nb and Rh are arranged alternately, for example, a disk-like material in which Nb and Rh are arranged radially alternately can be used. When such a disk-like target material is used, fine composite-metal particles having a desired composition ratio of Nb to Rh can be produced relatively easily, by changing the surface areas of Nb and Rh, or the area ratio of Nb to Rh, as appropriate.

However, the likelihood of metal being ejected from the target material when sputtering process is carried out, varies depending on the respective metal elements. Thus, the composition ratio of the metal elements in the target material may be selected taking into consideration the likelihood of Nb and Rh to be ejected.

The composition ratio of Nb to Rh upon mixing the Nb powder and the Rh powder may be correlated or proportional to the composition ratio of Nb to Rh in the fine composite-metal particles produced by sputtering.

<Sputtering>

According to the method of the present invention, the method includes sputtering a target material containing Nb and Rh, in order to produce fine composite-metal particles containing Nb and Rh.

The sputtering process as described above can be carried out under any suitable conditions, for example, under any conditions of gas components and of a gas pressure, and under any conditions of a sputtering current, voltage, period of time, and number of times.

Examples of the gas component to be used in the sputtering process include inert gases, such as helium (He), neon (Ne), argon (Ar), krypton (Kr), xenon (Xe), nitrogen ($N_2$), and the like. Among these, Ar or $N_2$ is preferred, from the viewpoint of its ease of handling.

The gas pressure to be used in the sputtering process can be selected freely, as long as it is a gas pressure at which plasma can be generated. The gas pressure is preferably 20 Pa or less, in general.

The current and voltage to be used in the sputtering process can be selected as appropriate depending on the composition of the target material or the sputtering apparatus to be used.

The period of time for sputtering may be selected as appropriate, in view of the desired amount of deposition of the fine composite-metal particles and of other parameters and the like. For example, it can be selected as appropriate in the range of from several tens of minutes to several tens of hours, but not particularly limited thereto.

The sputtering process can be carried out for a plurality of times, at an interval of several hours, in order to prevent the fine composite-metal particles and the like which were produced from the target material, from being heated to a high temperature at which sintering or the like may occur, due to sputtering over a long period of time. The sintering refers to a phenomenon in which fine metal particles grow at a temperature equal to or less than the melting point of the metal.

<Other Components>

With respect to the above mentioned components, the following descriptions regarding the exhaust gas purification catalyst can be referred to.

<<Exhaust Gas Purification Catalyst>>

The exhaust gas purification catalyst according to the present invention includes a plurality of fine composite-metal particles containing Nb and Rh.

Without being bound by any theory, the reason that the exhaust gas purification catalyst according to the present invention is capable of exhibiting an improved NOx purification performance in a lean atmosphere is believed to be that, since Nb having an excellent NOx adsorption capacity and Rh having an excellent NOx reducing ability are formed in a composite and exist in close proximity to each other at nano-level, NOx adsorbed to Nb is swiftly reduced to $N_2$ on Rh.

When Nb and Rh exist in close proximity to each other at nano-level in the fine composite-metal particles, the above mentioned improved NOx purification performance can be exhibited. Even when a portion of fine composite-metal particles are converted to oxide, for example, the exhaust gas purification catalyst according to the present invention is still capable of exhibiting an improved NOx purification performance.

Further, the exhaust gas purification catalyst according to the present invention further includes a powdered support, and the fine composite-metal particles are supported on the powdered support.

When the fine composite-metal particles are supported on the powdered support, since the powdered support has a high specific surface area, the contact area between the exhaust gas and the fine composite-metal particles can be increased. Therefore, it is possible to improve the performance of the exhaust gas purification catalyst.

<Fine Composite-Metal Particles>

The fine composite-metal particles contain Nb and Rh.

When the fine composite-metal particles have too large a particle size, the specific surface area is decreased, to result in a reducing absorption sites for NOx on Nb and in reducing active sites for NOx on Rh, and the finally resulting exhaust gas purification catalyst may not have a sufficient NOx reducing ability.

Further, when the fine composite-metal particles have too small a particle size, there is a possibility that the exhaust gas purification catalyst may be deactivated.

Therefore, the average particle size of the plurality of the fine composite-metal particles may be, for example, more than 0 nm, 1 nm or more, or 2 nm or more. Further, the average particle size of the fine composite-metal particles may be, for example, 100 nm or less, 70 nm or less, 40 nm or less, 10 nm or less, 7 nm or less, 5 nm, 4 nm, or 3 nm or less.

In particular, in terms of effectively reducing NOx, the average particle size of the fine composite-metal particles is preferably in the range of from 1 nm to 5 nm, more preferably, in the range of from 1 nm to 4 nm, and still more preferably, in the range of from 2 nm to 3 nm.

Specifically, the particle size of the fine composite-metal particles is preferably in the range of from 1 nm to 10 nm, more preferably, in the range of from 1 nm to 5 nm, and still more preferably, in the range of from 1.7 nm to 3.2 nm.

Further, the particle size of 70%, 75%, 80%, 85%, 90%, or 95% or more of the fine composite-metal particles, based on the number of the particles, may be in the range of from 60% to 140%, 70% to 130%, 80% to 120%, or 90% to 110% of the average particle size of the plurality of the fine composite-metal particles.

By using the fine composite-metal particles having the above particle size as a catalyst component, it is possible to make sure that Nb and Rh coexist at nano-level, and to allow Nb to exhibit its NOx adsorbing effect and to allow Rh to exhibit its NOx reducing ability, effectively. Therefore, an exhaust gas purification catalyst having an improved NOx purification performance in a lean atmosphere can be obtained.

In the present invention, the "average particle size" refers to a value, unless otherwise specified, obtained by measuring the equivalent circle diameters (Heywood diameter) of 10 or more randomly selected particles using a tool and a method such as a scanning transmission electron microscope (STEM) and energy dispersive X-ray analysis (EDX), and by calculating the arithmetic mean of the measured values.

Further, in the present invention, the ratio "based on the number of the particles," refers to, unless otherwise specified, the ratio of the number of the fine composite-metal particles having a specific composition with respect to the total number of the fine composite-metal particles contained in the exhaust gas purification catalyst. The fine composite-metal particles contained in the exhaust gas purification catalyst according to the present invention have, even just one particle has, an excellent exhaust gas purification performance. Accordingly, it is to be understood that, when at least 70% or more of the fine composite-metal particles, based on the number of the particles, has a preferred composition, the exhaust gas purification catalyst according to the present invention is capable of purifying a larger amount of exhaust gas, in terms of value per specific mass, specific volume or specific surface area thereof.

When the average Nb content in the fine composite-metal particles is 1 atomic % or more and 30 atomic % or less, a sufficient number of active sites for NOx on Rh can be secured, while obtaining the effect of adsorbing NOx by Nb sufficiently.

Therefore, the average Nb content in a plurality of fine composite-metal particles is preferably 1 atomic % or more, 2 atomic % or more, 3 atomic % or more, or 4 atomic % or more; and preferably 30 atomic % or less, 20 atomic % or less, 15 atomic % or less, 13 atomic % or less, 10 atomic % or less, 8 atomic % or less, or 6 atomic % or less.

Further, the Nb content in 70%, 75%, 80%, 85%, 90%, or 95% or more of the fine composite-metal particles, based on the number of the particles may be in the range of from 40% to 160%, 50% to 150%, 60% to 140%, or 70% to 130% of the average Nb content in the plurality of the fine composite-metal particles.

When the fine composite-metal particles have the Nb content as described above, it is possible to: maintain the number of absorption sites for NOx on Nb; allow Rh to effectively exhibit its NOx purification performance; and as a result, obtain an exhaust gas purification catalyst having a markedly improved NOx reducing ability.

In the present invention, the "Nb content" refers to the ratio of the number of Nb atoms with respect to the total number of Nb atoms and Rh atoms contained in a fine composite-metal particle. For example, the "Nb content" in the present invention can be calculated, for example, by analyzing the fine composite-metal particle using an optical method such as STEM-EDX. Further, the "average Nb content" in the present invention can be obtained by measuring the Nb content in each of a plurality of fine particles randomly sampled from the exhaust gas purification catalyst, and by calculating the arithmetic mean of the measured values of the content.

<Powdered Support>

The powdered support supports the fine composite-metal particles.

The powdered support on which the fine composite-metal particles are supported is not particularly limited, and any metal oxide generally used as a powdered support in the art of exhaust gas purification catalyst can be used.

Examples of the powdered support as described above include: silica ($SiO_2$), zirconia ($ZrO_2$), ceria ($CeO_2$), alumina ($Al_2O_3$), titania ($TiO_2$), and solid solutions thereof, and combinations thereof.

The amount of fine composite-metal particles supported on the powdered support is not particularly limited, and it may generally be, for example, 0.01 parts by mass or more, 0.05 parts by mass or more, 0.1 parts by mass or more, 0.5 parts by mass or more, or 1 part by mass or more; or 5 parts by mass or less, 3 parts by mass or less, or 1 part by mass or less, with respect to 100 parts by mass of the powdered support.

<Others>

The fine composite-metal particles to be used in the exhaust gas purification catalyst according to the present invention can be produced by the above mentioned method according to the present invention. Further, the fine composite-metal particles can be used in the following method according to the present invention.

<<Method for Purifying Exhaust Gas>>

The method for purifying exhaust gas according to the present invention is a method in which the above mentioned exhaust gas purification catalyst according to the present invention is brought into contact with an exhaust gas containing NOx in a lean atmosphere, and thereby reducing NOx, to purify the exhaust gas.

The method according to the present invention is preferably used in an internal combustion engine which operates in a lean atmosphere. This is because, while HC and CO are easily oxidized and removed, NOx is less likely to be reduced and purified in a lean atmosphere, and thus it results in the emission of a large amount of NOx.

In order to bring the exhaust gas purification catalyst according to the present invention into contact with an exhaust gas containing NOx in a lean atmosphere, any method can be used.

The present invention will now described in further detail with reference to the following Examples, but the scope of the present invention is in no way limited by the following Examples.

EXAMPLES

Example 1

Sputtering Method: Synthesis of Catalyst Containing Rh—Nb Fine Composite-Metal Particles <Preparation of Target Material>

Nb powder and Rh powder were mixed at a composition ratio of 5:95, and the resulting mixture was molded and sintered to prepare a micromixed target material containing Nb and Rh.

<Preparation of Exhaust Gas Purification Catalyst>

The resulting target material and $Al_2O_3$ powder as a powdered support were placed in a sputtering apparatus filled with an Ar atmosphere, and a voltage was applied to a pair of electrodes attached to the sputtering apparatus to generate plasma between the electrodes, thereby carrying out the sputtering. After the sputtering, $Al_2O_3$ powder on which Rh—Nb fine composite-metal particles were supported was taken out of the sputtering apparatus, and thereby producing an exhaust gas purification catalyst.

Comparative Example 1

Sputtering Method: Synthesis of Catalyst Containing Rh Fine Metal Particles

A target material and an exhaust gas purification catalyst were prepared in the same manner as in Example 1, other than Rh powder alone was used in the above mentioned preparation of the target material.

Comparative Example 2

Chemical Reduction Method: Synthesis of Catalyst Containing Rh—Nb Fine Composite-Metal Particles <Preparation of Rh—Nb Fine Composite-Metal Particles>

A quantity of 0.520 mmol of a solution of rhodium chloride and 15 mL of 1-propanol were mixed to prepare a solution A. A quantity of 0.027 mmol of a solution of niobium chloride and 15 mL of ethanol were mixed to prepare a solution B. The resulting solutions A and B were mixed to obtain a mixed solution C.

Further, 5.480 mmol (0.61 g; about 10 times equivalent with respect to the total molar quantity of Rh metal and Nb metal) of PVP-K25 as a protecting agent was measured, and the resultant was mixed with 280 mL of 1-propanol in a 500 mL flask to allow PVP-K25 to dissolve, thereby preparing a mixed solution D.

A quantity of 0.110 mmol (about 0.20 times equivalent with respect to the total molar quantity of Rh metal and Nb metal) of $NaBH_4$ as a reducing agent was measured, and the resultant was mixed with 5 mL of ethanol to allow $NaBH_4$ to dissolve, thereby preparing a mixed solution E.

The resulting mixed solutions C and D were mixed, and the resultant was degassed with $N_2$. Further, the resulting mixture of the mixed solutions C and D, and the resulting mixed solution E were mixed to prepare a mixed solution F. Note that, the resulting mixed solution E was used immediately after it was prepared. After mixing, the color of the mixed solution F turned to black.

The resulting mixed solution F was heated to reflux for 2 hours, while degassing with $N_2$. After heating to reflux, the mixed solution F was cooled to room temperature, while stirring. The resulting product was a black liquid, and no precipitation was observed in the product.

<Preparation of Exhaust Gas Purification Catalyst>

The resulting product was concentrated, and the resultant was mixed with a dispersed solution composed of 1-propanol solvent and $Al_2O_3$, to obtain a mixed solution G. The resulting mixed solution G was allowed to evaporate to dryness while stirring, to support the above mentioned product on $Al_2O_3$. The resulting supporting material was dried overnight in a furnace controlled at 120° C., cracked, and calcined at 500° C. for 3 hours to eliminate residues such as PVP in the supporting material, thereby preparing an exhaust gas purification catalyst.

Comparative Example 3

Chemical Reduction Method: Synthesis of Catalyst Containing Rh Fine Metal Particles An exhaust gas purification catalyst was prepared in the same manner as in Comparative Example 2, other than in the above mentioned preparation of mixed solution C, a solution of rhodium chloride alone was used.

<ICP-MS Analysis>

Each of the exhaust gas purification catalysts prepared in Example 1 and Comparative Examples 1 to 3 was analyzed by ICP-MS (high frequency inductively coupled plasma mass spectrometry apparatus). Based on the result of the analysis, the percent by mass concentration of Rh based on $Al_2O_3$, and the composition ratio of Nb to Rh in the exhaust gas purification catalysts in each of the Example and Comparative Examples were evaluated.

As a result, the percent by mass concentration of Rh based on $Al_2O_3$ in each of the Example and Comparative Examples was about 1% by mass. Further, the composition ratio of Nb to Rh in the exhaust gas purification catalyst in each of the Example and Comparative Examples are shown in the following Table 1.

<STEM-EDX and XRD Analyses>

The exhaust gas purification catalysts prepared in Example 1 and Comparative Examples 1 to 3 were subjected to STEM-EDX and XRD analyses to obtain respective STEM images, and from each of the STEM images, a plurality of fine metal particles were sampled as measurement points, and the state, composition, and particle size of each of the fine metal particles at each of the measurement points were evaluated. The results of Example 1 are shown in Table 1 and FIGS. 1 to 3; the results of Comparative Example 2 are shown in Table 1 and FIGS. 4 and 5; and the results of other Comparative Examples are shown in Table 1.

TABLE 1

Relationship between exhaust gas purification catalyst and fine metal particles included therein

| | Production method | Form of fine metal particles | Average composition ratio of Nb to Rh | Average particle size (nm) |
|---|---|---|---|---|
| Example 1 | Sputtering method | Fine composite particles of Nb and Rh | 5:95 | 2.5 |
| Comparative Example 1 | Sputtering method | Rh fine particles | 0:100 | 2.5 |
| Comparative Example 2 | Reduction method | Rh fine particles* | 0:100 | 4.1 |
| Comparative Example 3 | Reduction method | Rh fine particles | 0:100 | 4.3 |

Note that, "Rh fine particles*" in Table 1 indicates that no L line of Nb was detected by the energy dispersive X-ray analysis (EDX) carried out for the fine metal particles in the exhaust gas purification catalyst in Comparative Example 2.

Figure 2:
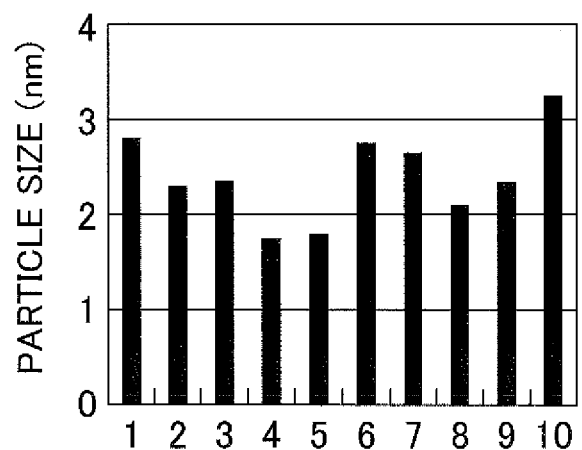
FIG. 2 is a graph illustrating the distribution of the particle size (nm) of 10 fine particles randomly sampled from the exhaust gas purification catalyst in Example 1.

FIG. 1 is a STEM image of the exhaust gas purification catalyst in Example 1, obtained by analyzing the catalyst by a scanning transmission electron microscope with an energy dispersive X-ray analyzer (STEM-EDX). Further, FIG. 2 is a graph illustrating the distribution of the particle size (nm) of 10 fine particles randomly sampled from the exhaust gas purification catalyst in Example 1. In addition, FIG. 3 is a graph illustrating the distribution of the Nb content (%) in 10 fine particles randomly sampled from the exhaust gas purification catalyst in Example 1.

Referring to FIG. 1 and FIG. 2, it can be seen that the fine metal particles having a particle size in the range of from 1.5 nm to 3.5 nm are dispersed on the surface of $Al_2O_3$ as the powdered support. Specifically, it is understood that the average particle size of a plurality of the fine metal particles is about 2.5 nm, and that the plurality of the fine metal particles have a particle size in the range of from 60% to 140% of the average particle size of the plurality of the fine metal particles.

Figure 3:
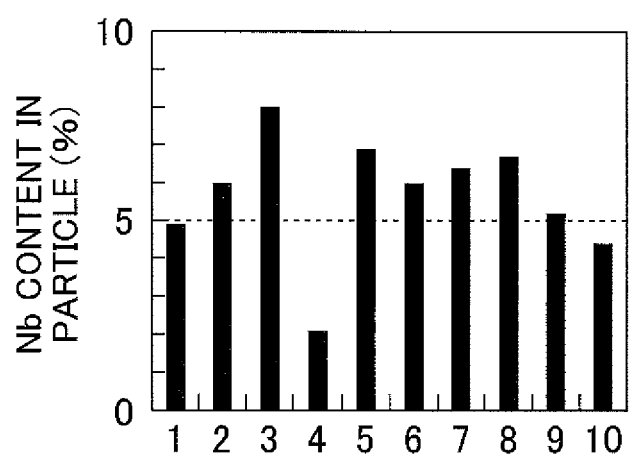
FIG. 3 is a graph illustrating the distribution of the Nb content (%) in 10 fine particles randomly sampled from the exhaust gas purification catalyst in Example 1.

Referring to FIG. 3, it can be seen that the plurality of the fine metal particles have a Nb content (%) in the range of from 2 atomic % to 8 atomic %. In other words, it is understood that the plurality of the fine metal particles have a Rh content in the range of from 98 atomic % to 92 atomic %. Therefore, it is understood from FIG. 3 that the average Nb content in the plurality of the fine metal particles is about 5%, and that the plurality of the fine metal particles have a Nb content in the range of from 40% to 160% of the average Nb content in the plurality of the fine metal particles.

Accordingly, it is understood from FIGS. 1 to 3 and Table 1 that, the fine metal particles of the exhaust gas purification catalyst in Example 1 are fine composite-metal particles containing Nb and Rh; the plurality of the fine composite-metal particles have an approximately uniform Nb content; and the plurality of the fine composite-metal particles have an approximately uniform particle size, and are dispersed on the powdered support.

Figure 4:
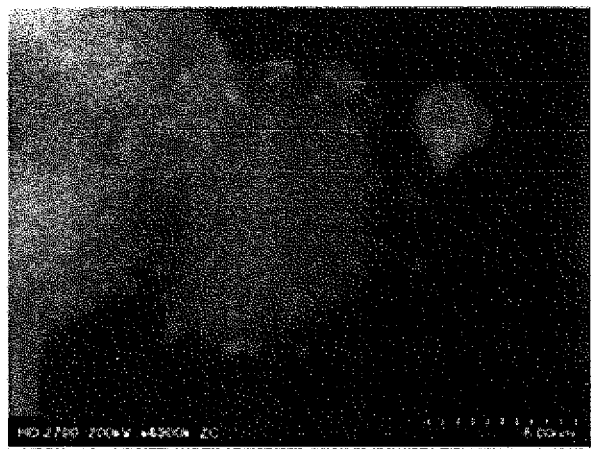
FIG. 4 is a STEM image of the exhaust gas purification catalyst in Comparative Example 2, obtained by analyzing the catalyst by a scanning transmission electron microscope with an energy dispersive X-ray analyzer (STEM-EDX).

FIG. 4 is a STEM image of the exhaust gas purification catalyst in Comparative Example 2, obtained by analyzing the catalyst by a scanning transmission electron microscope with an energy dispersive X-ray analyzer (STEM-EDX). Further, FIG. 5 is a graph illustrating the distribution of the particle size (nm) of 10 fine particles randomly sampled from the exhaust gas purification catalyst in Comparative Example 2.

Figure 5:
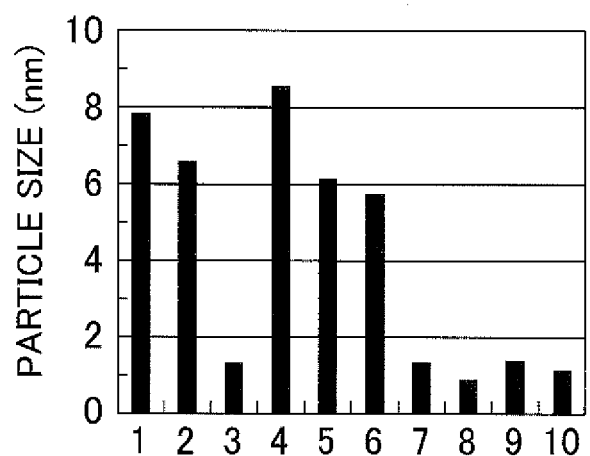
FIG. 5 is a graph illustrating the distribution of particle size (nm) of 10 fine particles randomly sampled from the exhaust gas purification catalyst in Comparative Example 2.

Referring to FIG. 4 and FIG. 5, it can be seen that the fine metal particles having a particle size in the range of from 1.0 nm to 8.5 nm are present on the surface of $Al_2O_3$ as the powdered support. Therefore, it is understood from FIG. 5 that the average particle size of a plurality of the fine metal particles is about 4.7 nm, and that the plurality of the fine metal particles have a particle size in the range of from 20% to 180% of the average particle size of the plurality of the fine metal particles.

Accordingly, it is understood from FIG. 4 and FIG. 5 that the fine metal particles in the exhaust gas purification catalyst in Comparative Example 2 are fine metal particles of Rh alone, and that the uniformity in the particle size of the plurality of the Rh fine metal particles in Comparative Example 2 is lower compared to the uniformity in the particle size of the plurality of the Rh—Nb fine composite-metal particles in the above mentioned Example 1.

Without being bound by any theory, the reason for failing to produce Rh—Nb fine composite-metal particles with the method of Comparative Example 2 is believed to be that Rh ions, which are more susceptible to reduction as compared to Nb ions due to the difference in oxidation-reduction potential, were preferentially reduced, thereby resulting in the growth of Rh particles.

<Evaluation of Catalysts>

The powders of the exhaust gas purification catalysts prepared in Example 1 and Comparative Examples 1 to 3 were pressed at a pressing pressure of 2 t/cm² to be formed into pellets, and the resulting catalysts in the form of pellets were further cracked to be formed into granules. The resulting catalysts in the form of granules were used as samples.

In the evaluation of catalysts, a gas circulation type catalyst evaluation apparatus was used. Specifically, the composition of the test gas after being brought into contact with each of the samples was measured using infrared spectroscopy.

The evaluation of catalysts was carried out by measuring the NO purification rate (%) and the corresponding temperature of the catalysts, and by measuring the NO selectivity of the catalysts at 400° C.

The mass of each of the above mentioned samples was 2 g, and the composition of the test gas was as follows: CO: 0.65%, $C_3H_6$: 3,000 ppmC (1,000 ppm), NO: 1,500 ppm, $O_2$: 0.7% to 3%, $H_2O$: 3%, $CO_2$: 10%, and $N_2$: balance.

Further, the flow velocity of the test gas was set to 10 L/min, and the space velocity (SV: Space Velocity) was set to 200,000 $h^{-1}$. Note that, the space velocity refers to a value obtained by dividing the value of the flow rate (volume/h) of the test gas by the value of the volume of the sample.

The "$\lambda$", which is an index of the strength of the lean atmosphere, is defined as "oxidizing agent equivalent/reducing agent equivalent". For example, the rich, stoichiometric, and lean atmospheres can be represented as $\lambda<1$, $\lambda=1$, and $\lambda>1$, respectively.

(Measurement of NO Purification Rate (%) and Corresponding Temperature (° C.))

Figure 6:
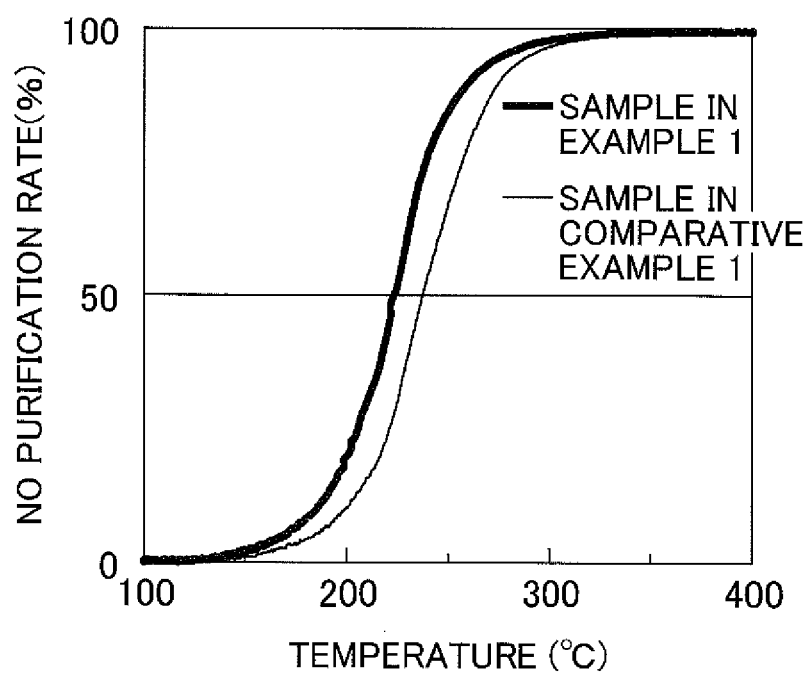
FIG. 6 is a graph illustrating the relationship between the NO purification rate (%) and the corresponding temperature (° C.).

The NO purification rate (%) and the corresponding temperature were measured under stoichiometric ($\lambda=1$) conditions. The subjects to be measured are samples in Example 1 and Comparative Example 1. The results are shown in FIG. 6.

The NO purification rate (%) can be represented by the following equation (I).

$$\text{NO purification rate (\%)} = \{(NO_{in} - NO_{out})/NO_{in}\} \times 100 \quad (I)$$

[wherein, $NO_{in}$: the amount of NO flowed into the catalyst evaluation apparatus, and $NO_{out}$: the amount of NO flowed out of the catalyst evaluation apparatus]

FIG. 6 is a graph illustrating the relationship between the NO purification rate (%) and the corresponding temperature (° C.). It can be seen from FIG. 6 that the sample in Example 1 achieved a higher NO purification rate (%) as compared to the sample in Comparative Example 1, at a predetermined temperature. In particular, regarding the temperature at which 50% NO purification (%) is achieved, it can be seen that the temperature of the sample in Example 1 is about 15° C. lower than the temperature of the sample in Comparative Example 1.

This is believed to be that since Nb having an excellent NOx adsorption capacity and Rh having an excellent NOx reducing ability are formed in a composite and exist in close proximity to each other at nano-level, NOx adsorbed to Nb was swiftly reduced to $N_2$ on Rh.

Therefore, it is understood that the exhaust gas purification performance of the sample in Example 1 is higher than the exhaust gas purification performance of the sample in Comparative Example 1.

(Measurement of NO Selectivity at 400° C.)

Figure 7:
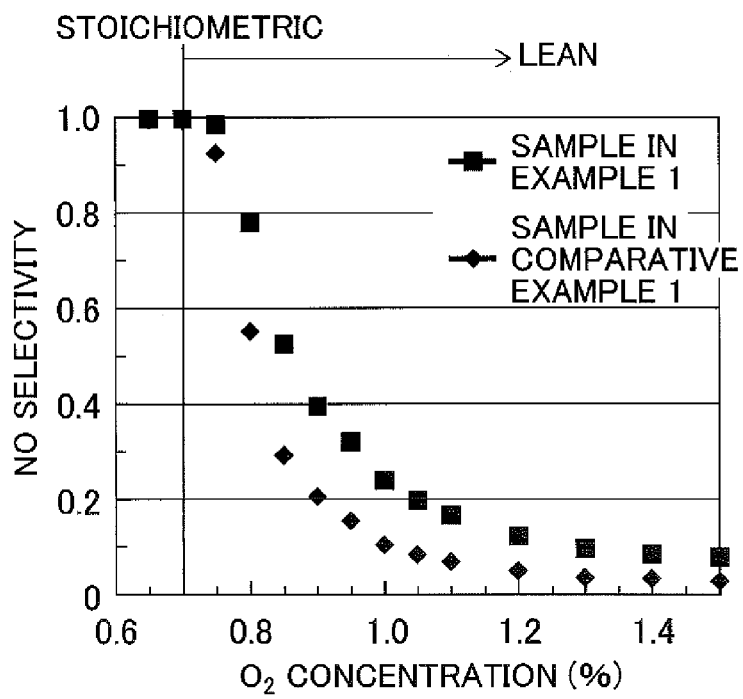
FIG. 7 is a graph illustrating the relationship between the $O_2$ concentration (%) and the NO selectivity at 400° C.
Figure 8:
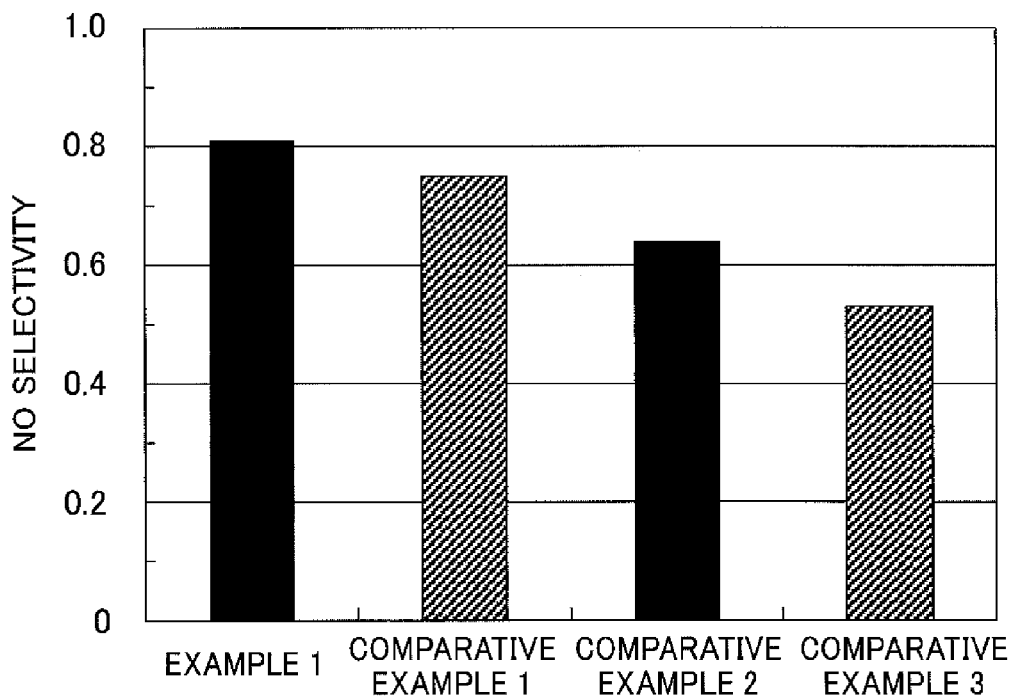
FIG. 8 is a graph illustrating the NO selectivity of the samples in Example 1 and Comparative Examples 1 to 3, when λ=1.07 ($O_2$=0.75%), and the temperature is 400° C.

The measurement of the NO selectivity was carried out under the conditions of 400° C. The subjects to be measured are the samples in Example 1 and Comparative Examples 1 to 3. Results are shown in FIG. 7 and FIG. 8.

The NO selectivity can be represented by the following equation (II).

$$\text{NO selectivity} = \text{NO purification rate (\%)}/O_2 \text{ reaction rate (\%)} \quad (II)$$

Further, the $O_2$ reaction rate (%) can be represented by the following equation (III).

$$O_2 \text{ reaction rate (\%)} = \{(O_{2(in)} - O_{2(out)})/O_{2(in)}\} \times 100 \quad (III)$$

[wherein, $O_{2(in)}$: the amount of $O_2$ flowed into the catalyst evaluation apparatus, and $O_{2(out)}$: the amount of $O_2$ flowed out of the catalyst evaluation apparatus]

FIG. 7 is a graph illustrating the relationship between the $O_2$ concentration (%) and the NO selectivity at 400° C. It can be seen from FIG. 7 that the sample in Example 1 achieved a higher NO selectivity as compared to the sample in Comparative Example 1, at a predetermined $O_2$ concentration (%).

FIG. 8 is a graph illustrating the NO selectivity of the samples in Example 1 and Comparative Examples 1 to 3, when λ=1.07 ($O_2$=0.75%), and the temperature is 400° C. It can be seen from FIG. 8 that the sample in Example 1 has a higher NO selectivity as compared to the samples in Comparative Examples 1 to 3. Further, it is understood from FIG. 8 that the sample in Example 1, which was prepared by a sputtering method using a micro-mixed target material containing Nb and Rh, has a higher NO selectivity as compared to the sample in Comparative Example 2, which was prepared by a chemical reduction method in which a solution of rhodium chloride and a solution of niobium chloride were used as raw materials.

While preferred embodiments of the present invention have been described in detail, those skilled in the art will recognize that the manufacturer, grade, quality and the like of the apparatuses, equipment, chemicals and the like used in the present invention can be changed without departing from the scope of the claims.

What is claimed is:

1. A method for producing an exhaust gas purification catalyst, the method comprising sputtering a target material containing Nb and Rh to produce fine composite-metal particles containing Nb and Rh.

2. The method according to claim 1, further comprising supporting the fine composite-metal particles on a powdered support.

3. The method according to claim 1, wherein the target material is a micro-mixed target material obtained by mixing Nb powder and Rh powder, and then by molding and sintering the resultant.

4. An exhaust gas purification catalyst comprising a plurality of fine composite-metal particles containing Nb and Rh.

5. The exhaust gas purification catalyst according to claim 4, further comprising a powdered support, wherein the fine composite-metal particles are supported on the powdered support.

6. The exhaust gas purification catalyst according to claim 5, wherein the powdered support is a powdered support selected from the group consisting of $SiO_2$, $ZrO_2$, $CeO_2$, $Al_2O_3$, $TiO_2$, solid solutions thereof, and combinations thereof.

7. The exhaust gas purification catalyst according to claim 4, wherein the average Nb content in the plurality of the fine composite-metal particles is 1 atomic % or more and 30 atomic % or less.

8. The exhaust gas purification catalyst according to claim 7, wherein 70% or more of the fine composite-metal particles, based on the number of the particles, have a Nb content in the range of from 40% to 160% of the average Nb content in the plurality of the fine composite-metal particles.

9. The exhaust gas purification catalyst according to claim 4, wherein 70% or more of the fine composite-metal particles, based on the number of the particles, have a particle size in the range of from 60% to 140% of the average particle size of the plurality of the fine composite-metal particles.

10. The exhaust gas purification catalyst according to claim 4, wherein the exhaust gas purification catalyst is a catalyst for purifying NOx.

11. A method for purifying exhaust gas, wherein the exhaust gas purification catalyst according to claim 10 is brought into contact with an exhaust gas containing NOx in a lean atmosphere, and thereby reducing NOx, to purify the exhaust gas.

* * * * *